(12) United States Patent
Rini et al.

(10) Patent No.: US 7,350,818 B2
(45) Date of Patent: Apr. 1, 2008

(54) VEHICLE FRAME RAIL

(75) Inventors: Nicholas Michael Rini, Duncan, SC (US); Mark Waitman Pitsenbarger, Moore, SC (US)

(73) Assignee: Freightliner LLC, Portland, OR (US)

( * ) Notice: Subject to any disclaimer, the term of this patent is extended or adjusted under 35 U.S.C. 154(b) by 357 days.

(21) Appl. No.: 10/975,691

(22) Filed: Oct. 27, 2004

(65) Prior Publication Data

US 2005/0110263 A1    May 26, 2005

Related U.S. Application Data

(60) Provisional application No. 60/525,064, filed on Nov. 24, 2003.

(51) Int. Cl.
*B62D 21/02* (2006.01)
(52) U.S. Cl. .................................. 280/781; 280/800
(58) Field of Classification Search ............... 280/781, 280/786, 789, 797, 798, 799, 800; 296/193.07, 296/193.09, 204
See application file for complete search history.

(56) References Cited

U.S. PATENT DOCUMENTS

| | | | |
|---|---|---|---|
| 246,006 A | 8/1881 | McBride et al. | |
| 875,254 A | 12/1907 | Gartshore | |
| D54,443 S | 2/1920 | Moore | |
| 1,433,161 A * | 10/1922 | Smith et al. | 180/311 |
| 1,552,645 A * | 9/1925 | Powell | 267/268 |
| 1,638,948 A | 8/1927 | Masury et al. | |
| 1,717,867 A | 6/1929 | Wright | |
| 1,872,506 A | 8/1932 | Sage | |
| 2,551,528 A | 5/1951 | Darrin | |
| 3,096,996 A | 7/1963 | Cole | |
| 4,147,379 A | 4/1979 | Winslow | |
| 4,386,792 A | 6/1983 | Moore et al. | |
| 5,561,902 A | 10/1996 | Jacobs et al. | |
| 5,863,070 A * | 1/1999 | Williams et al. | 280/781 |
| 6,412,818 B1 | 7/2002 | Marando | |
| 6,494,285 B1 * | 12/2002 | Williams | 180/291 |
| 6,540,280 B2 * | 4/2003 | Crean et al. | 296/108 |
| 6,688,678 B2 * | 2/2004 | Crean | 296/204 |

(Continued)

FOREIGN PATENT DOCUMENTS

JP    2000-142495    *  5/2000

OTHER PUBLICATIONS

Drawing of prior art Rear Frame Rail Drop Down Extension.

(Continued)

*Primary Examiner*—Paul N. Dickson
*Assistant Examiner*—Joseph Rocca
(74) *Attorney, Agent, or Firm*—Klarquist Sparkman, LLP

(57) ABSTRACT

The vehicle frame rail in one form has front, middle and rear portions which are seamlessly joined together to form a unitary one-piece monolithic frame rail. The frame rail may be straight with an upper surface of an upper flange of the frame rail being planar. At the transition regions of this form of frame rail form, the lower flange converges toward the upper flange at a transition between the front and middle portion and diverges from the upper flange at a transition from the middle portion to the rear portion. The upper flange of the frame rail may converge toward the lower flange along a rearmost section of the frame rail.

32 Claims, 5 Drawing Sheets

U.S. PATENT DOCUMENTS

2002/0066184 A1* 6/2002 Crean .................. 29/897.2
2003/0178834 A1* 9/2003 Grimm et al. ............. 280/781
2003/0227165 A1* 12/2003 Herrmann et al. .......... 280/781

OTHER PUBLICATIONS

English translation of JP2000-142495, received Sep. 17, 2007.

* cited by examiner

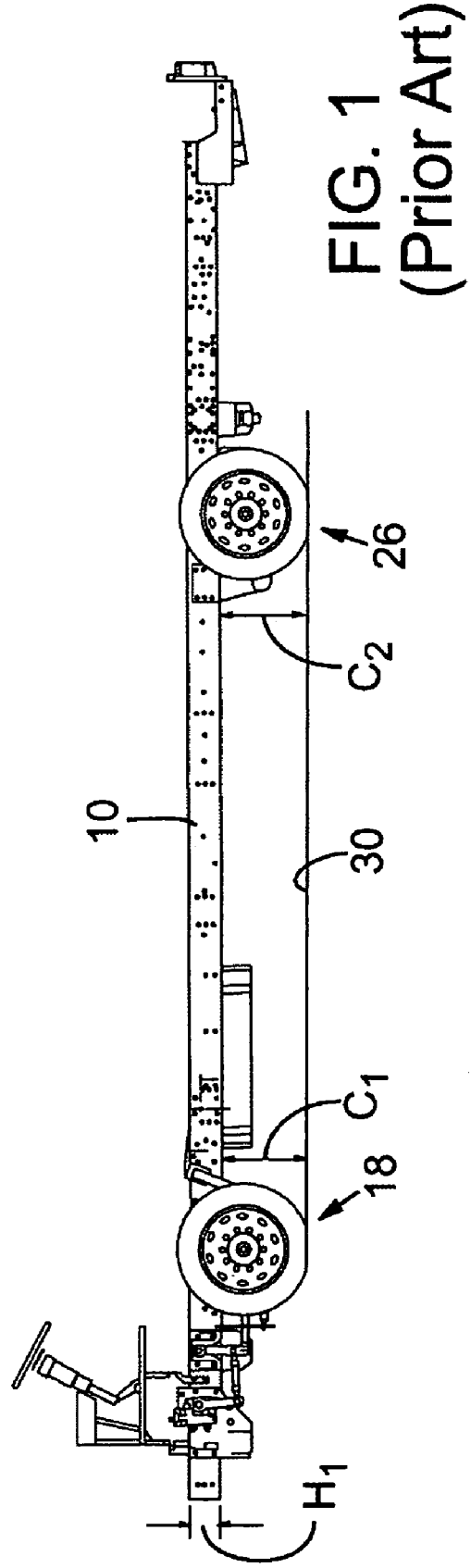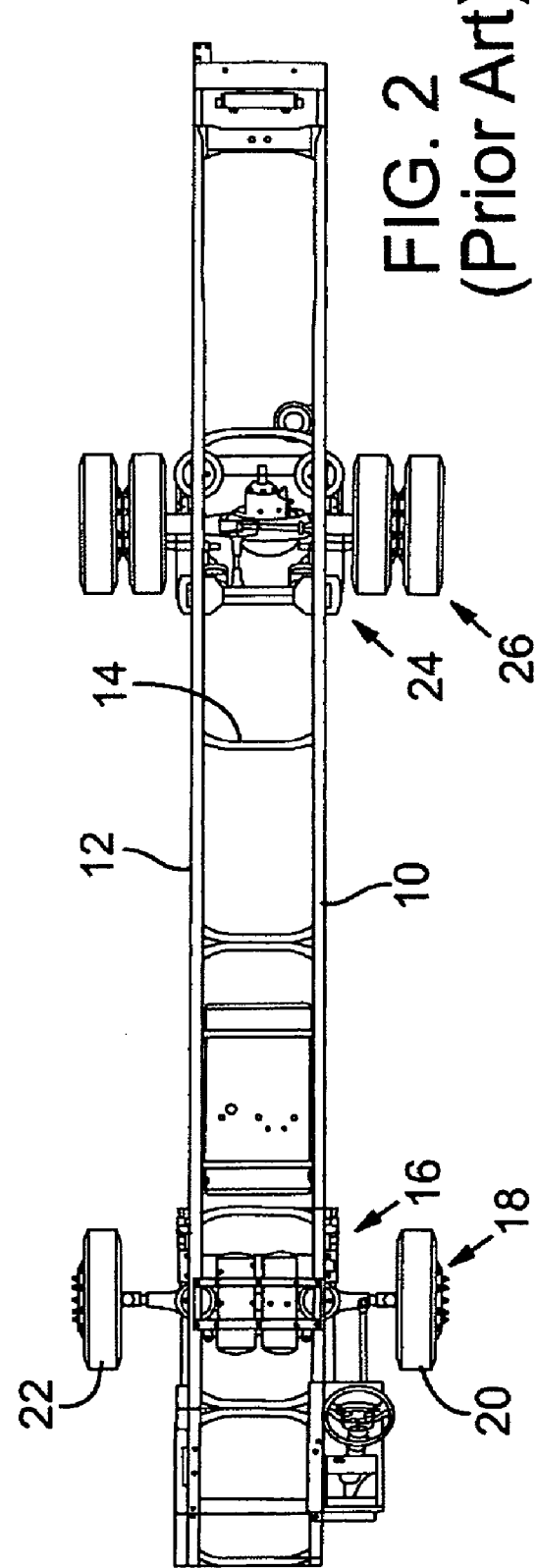

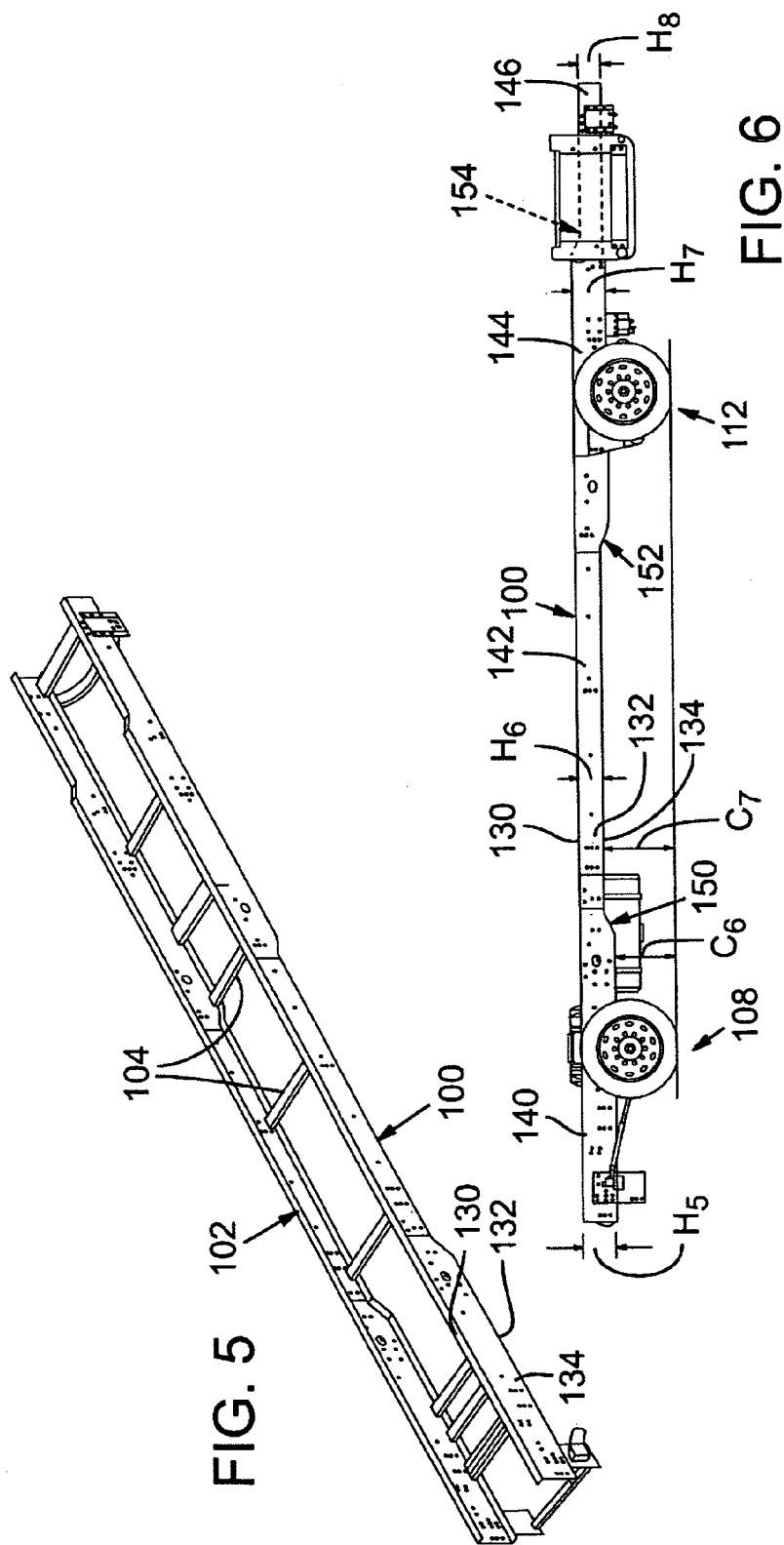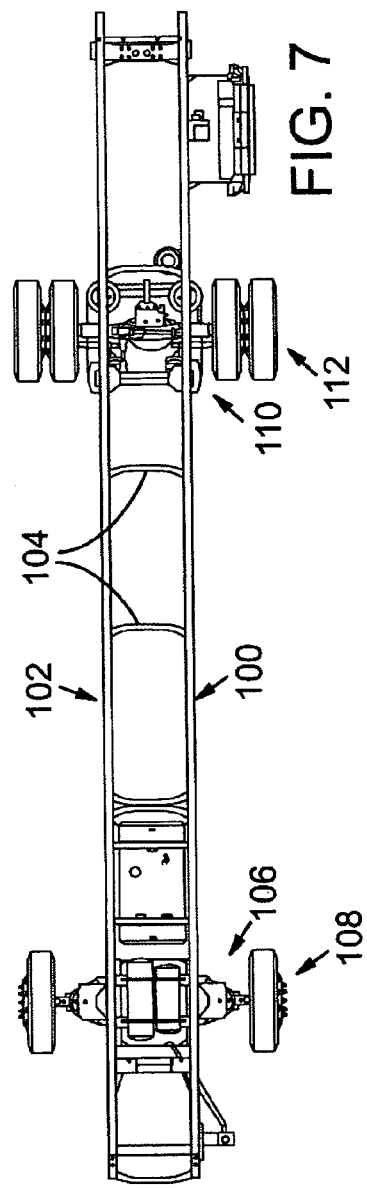

FIG. 8A
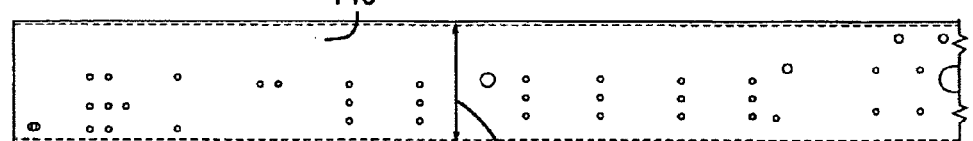
FIG. 8
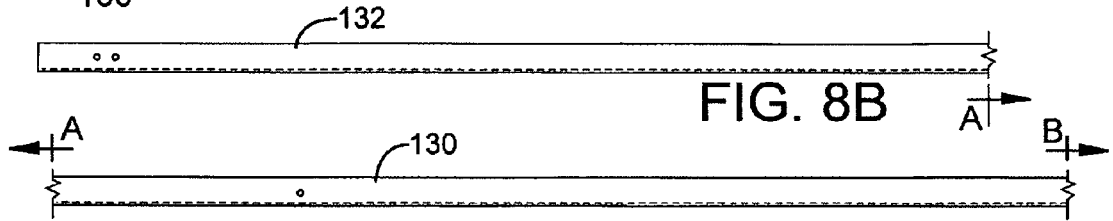
FIG. 8B
FIG. 9A
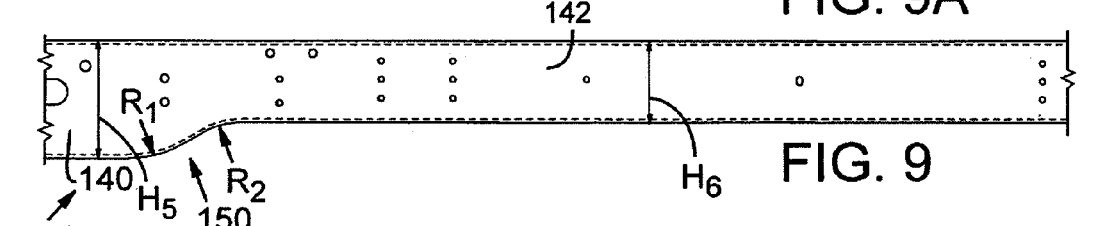
FIG. 9
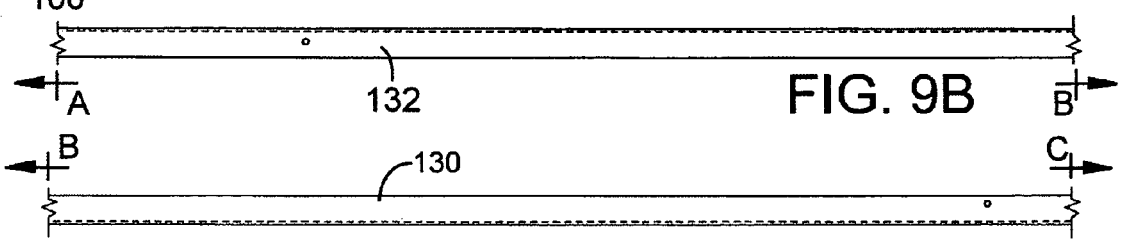
FIG. 9B
FIG. 10A
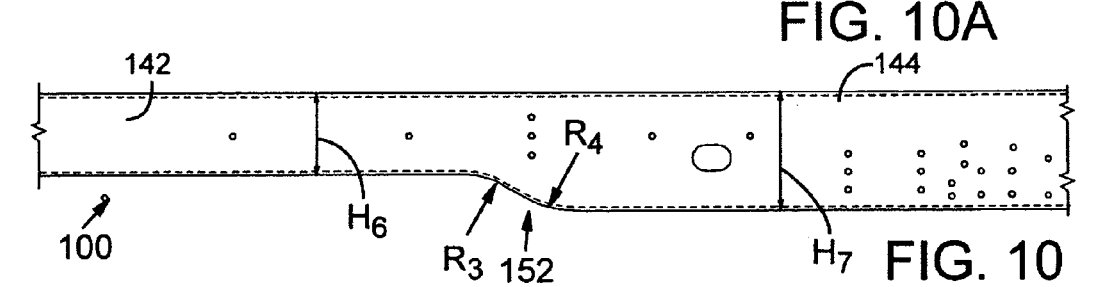
FIG. 10
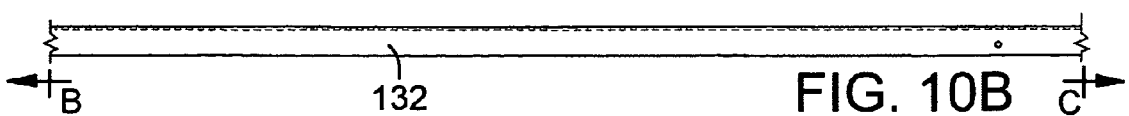
FIG. 10B

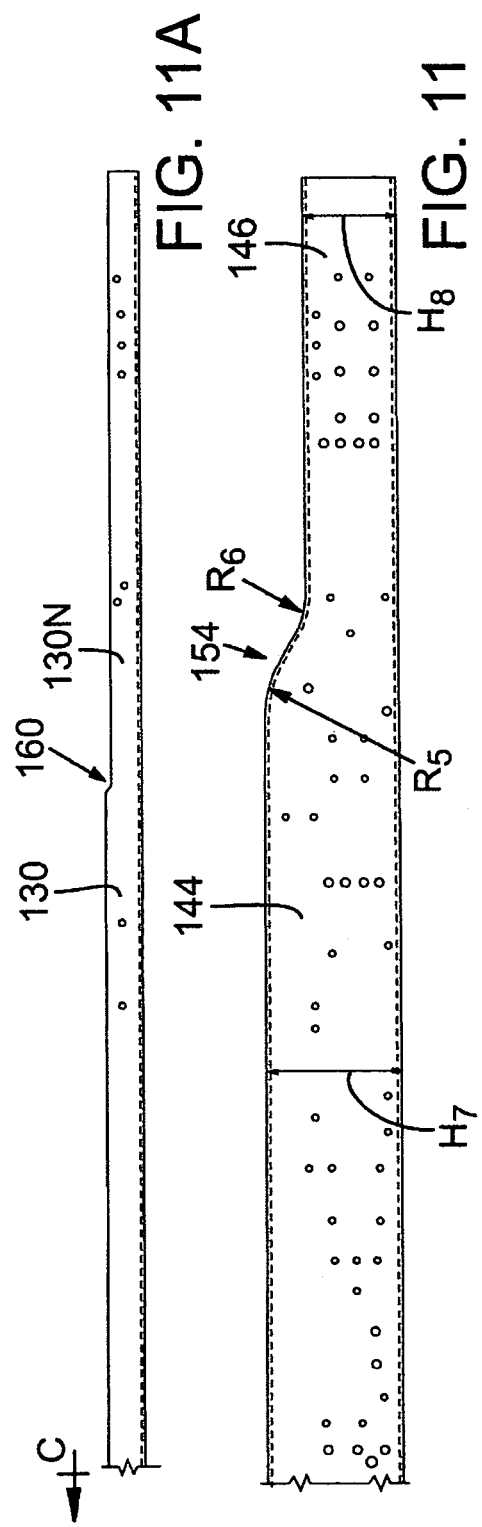
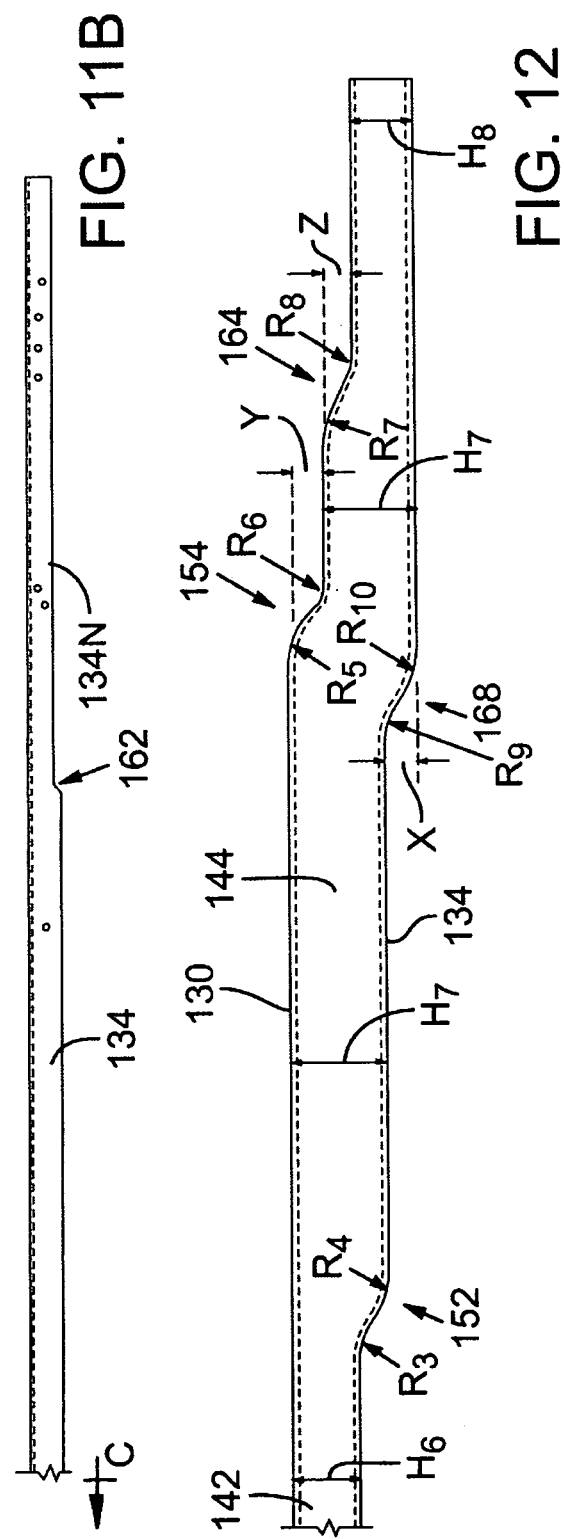

VEHICLE FRAME RAIL

RELATED APPLICATION DATA

This application claims the benefit of U.S. patent application Ser. No. 60/525,064, filed Nov. 24, 2003, entitled, "Vehicle Frame Rail", by Nicholas Michael Rini and Mark Waitman Pitsenbarger, which is hereby incorporated by reference.

TECHNICAL FIELD

The present invention relates to improved frame rails for vehicles and which have particular applicability to recreational vehicles. The present invention also relates to vehicles which incorporate such frame rails and also chassis constructions which incorporate such frame rails.

BACKGROUND

FIGS. 1 and 2 illustrate one known form of frame rail incorporated into a chassis of a recreational vehicle such as for a Winnebago® motorhome. The construction of FIGS. 1 and 2 include spaced apart parallel frame rails 10,12 which are interconnected by a plurality of cross-members, one being indicated at 14 in FIG. 2. A front suspension 16 is coupled to the frame rails 10,12 and also to an axle structure 18 which carries first and second wheels and tires 20,22. A rear suspension 24 is coupled to the frame rails 10,12 and supports and axle and tandem wheel structure 26 toward the rear of the chassis.

The frame rails of FIGS. 1 and 2 are generally of a C-shaped configuration with upper and lower inwardly extending flanges interconnected by an upright or vertical web. The frame rails of FIGS. 1 and 2 have a height $H_1$ which in one specific known embodiment is 9 inches. The height $H_1$ is constant along the full length of each of the frame rails 10,12.

A clearance $C_1$ exists between the underside of frame rails 10,12 and the ground 30 adjacent to front wheels 18. In addition, a clearance $C_2$ exists between the underside of frame rails 10,12 and the ground 30 adjacent to the rear wheels 26. In known constructions, $C_2$ may be slightly greater than $C_1$. The actual clearances $C_1$ and $C_2$ vary with the tire size and suspension that is being used. For example, an average clearance in the section between the front and rear wheels 18,26 between the underside of the frame rails and ground in one known construction is 25 inches.

Another form of known chassis and frame rail construction for a recreational vehicle is shown in FIGS. 3 and 4. This configuration is known as a stacked rail configuration. Each frame rail 40,42 in FIGS. 3 and 4 is an assembly of three separate rail sections. Thus, frame rail 40 has a first upper or top rail section 44 which extends from a location 46 forwardly of a set of wheels and axle 48 to a location 50 which is rearwardly of a set of rear wheels and axle 52. At the forward end of the chassis, rail section 44 is stacked on top of a rail section 54 which extends from a location 56 rearwardly of the wheels 48 to a location 58 at the forward end of the chassis. In addition, the frame rail 40 has a lower rear frame rail section 60 which extends from a location 62 forwardly of the wheels 52 to a location 62 at the rear of the chassis. The lower front rail section 54 extends forwardly of the front end of rail section 44 while the rail section 62 extends rearwardly of the rear end 50 of the rail section 44. In one known construction, the height $H_2$ of rail section 44 is 9 inches and the height $H_3$ of each of the rail sections 54,60 is also 9 inches. Thus, the overall height $H_4$ of the rail sections 44,54 (and of rail sections 44,60) is 18 inches. The rail sections 44,54 and 60 are also of a generally C-shaped configuration. The lower generally horizontal inwardly extending flange of rail section 44 is secured to the upper generally horizontal inwardly extending flange of rail section 54 and also to the upper generally horizontally inwardly extending flange of the rail section 60. Rail 42 in FIG. 4 is the mirror image of rail section 40 and is also a stacked three rail section assembly.

Assuming the clearance $C_4$ of the FIG. 3 embodiment is the same as the clearance $C_1$ in the FIG. 1 embodiment, then the average clearance $C_5$ between the wheels 48 and 52 (and more specifically between ends 56 and 62 of the rail sections 54,60) is 9 inches greater than the average clearance between the wheels 18,26 of the FIG. 1 configuration. This allows for the positioning of under frame rail storage compartments for convenient storage of articles being transported by a user of the vehicle, such as a recreational vehicle having a body (not shown in these figures) mounted to the chassis depicted therein.

Although frame rail constructions for vehicles such as recreational vehicles are known, a need exists for improved frame rails for such vehicles and for chassis and vehicles incorporating such frame rails.

DESCRIPTION OF THE DRAWINGS

FIG. 1 is a side elevational view of a prior art chassis having straight frame rails.

FIG. 2 is a top view of the chassis of FIG. 1.

FIG. 5 is a perspective view of an embodiment of interconnected frame rails of an improved design.

FIG. 6 is a side elevational view of a chassis including frame rails of the form shown in FIG. 5.

FIG. 7 is a top view of the chassis of FIG. 6.

FIGS. 8, 8A and 8B depict side elevational, top and bottom views of a section of one of the frame rails of FIG. 6.

FIGS. 9, 9A and 9B depict side elevational, top and bottom views of a central section of a frame rail of FIG. 6 adjacent to the section depicted in FIGS. 8, 8A and 8B.

FIGS. 10, 10A and 10B are respective side elevational, top and bottom views of a section of the frame rail of FIG. 6 adjacent to and rearwardly of the section depicted in FIGS. 9, 9A and 9B.

FIGS. 11, 11A and 11B are respective side elevational, top and bottom views of the rearmost frame rail section of the FIG. 6 embodiment, which is adjacent to the section depicted in FIGS. 10, 10A and 10B.

FIG. 12 is a side elevation view of an alternative form of a rearmost frame rail section.

DETAILED DESCRIPTION

Figure 3:
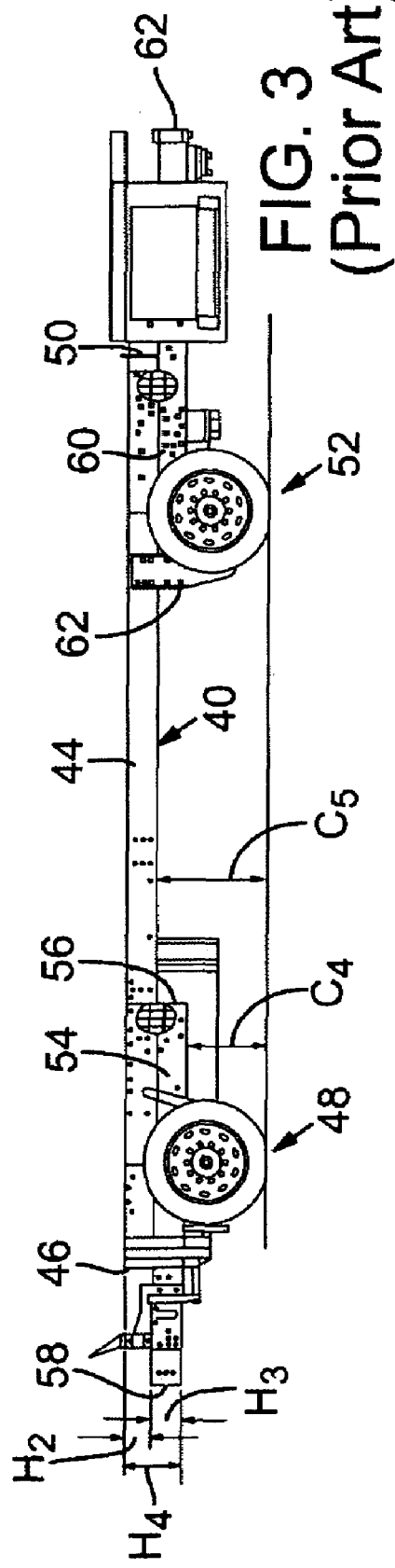
FIG. 3 is a side elevational view of a prior art chassis including plural stacked frame rail sections.

FIG. 5 illustrates one embodiment of a frame rail assembly comprised of improved frame rails 100,102 interconnected by various cross-members, with some of such cross-members being indicated by the number 104 in FIG. 5.

Desirably, the frame rails 100,102 are mirror images of one another. For this reason, the discussion below focuses on frame rail 100.

Most desirably, the frame rail 100 is formed of a single monolithic unitary homogeneous durable material, such as ASTM A656 Grade 50 steel. Frame rail 100 is preferably a straight rail, with straight being defined generally to mean substantially straight in a longitudinal direction.

With reference to FIG. 7, a front suspension 106 couples axle supported front wheels 108 to the respective frame rails 100,102. In addition, a rear suspension 110 couples an axle with tandem wheels indicated at 112 to the respective frame rails. The axle/wheel assembly 108 and axle/wheel assembly 112 extend perpendicularly to the respective rails 100,102. The chassis may have more than two axles, such as two rear axles and a front axle. In the chassis of FIGS. 6 and 7, the rails 100,102 are desirably parallel to one another and are supported at the same elevation. Although other cross-sectional configurations may be employed, desirably the cross-section of the rails 100,102 is generally C-shaped with an upper flange 130 (FIG. 5), an upright web 132 and a lower flange 134. The upper and lower flanges 130,134 are desirably parallel to one another and extend generally horizontally when the frame rail is supported on the axles except in transition regions between various front-to-rear sections of the rails.

With reference to FIG. 6, the frame rail 100 comprises a front section 140, a front intermediate section 142, a rear intermediate section 144 and a rearmost section 146. It should be understood that rearmost section 146 optionally may simply be an extension of rear intermediate section 144. Rail section 140 transitions through a transition region 150 to the section 142. In addition, rail section 142 transitions through a transition region 152 to the rail section 144. Also, rail section 144 transitions through a transition region 154 to rail section 146.

In the illustrated FIG. 6 embodiment, although not required, front rail section 140 is of a uniform height leading to the transition region 150 with this height being indicated at $H_5$. In addition, transition region 150 may have a generally S-shape along its lower edge portion as shown. The height $H_6$ of rail section 142 intermediate the transition regions 150,152 is desirably less than the height $H_5$. Desirably, $H_5$ is less than two times $H_6$ and more desirably $H_5$ is less than 1.5 times $H_6$. The transition region 152 may also be generally S-shaped along its lower edge portion. The height $H_7$ intermediate the transition regions 152,154 may be constant and desirably is the same as the height $H_5$. Alternatively, H7 may vary along its length and may be different than H5 such as somewhat greater than H5. At transition region 154, which may have an upper edge portion which is also of a generally S-shaped configuration, the frame rail transcends to the rearmost section 146. Section 146, although not required, may be of a constant height $H_8$. $H_8$ may vary, but in one specific example, is the same as $H_6$.

Thus, in the illustrated frame rail construction, the upper surface or upper flange 130 of rail 100 is at a constant elevation throughout frame rails sections 140,142 and 144 until the transition region 154, at which point the elevation of the upper flange of the frame rail is reduced. In addition, the elevation of the lower flange of the frame rail may be constant throughout the entire length of the frame rail except from transition region 150 along section 142 and along transition region 152. Intermediate frame rail section 142 is thus stepped up relative to the end frame rail sections. That is, the clearance $C_6$ is less than the clearance $C_7$.

Figure 4:
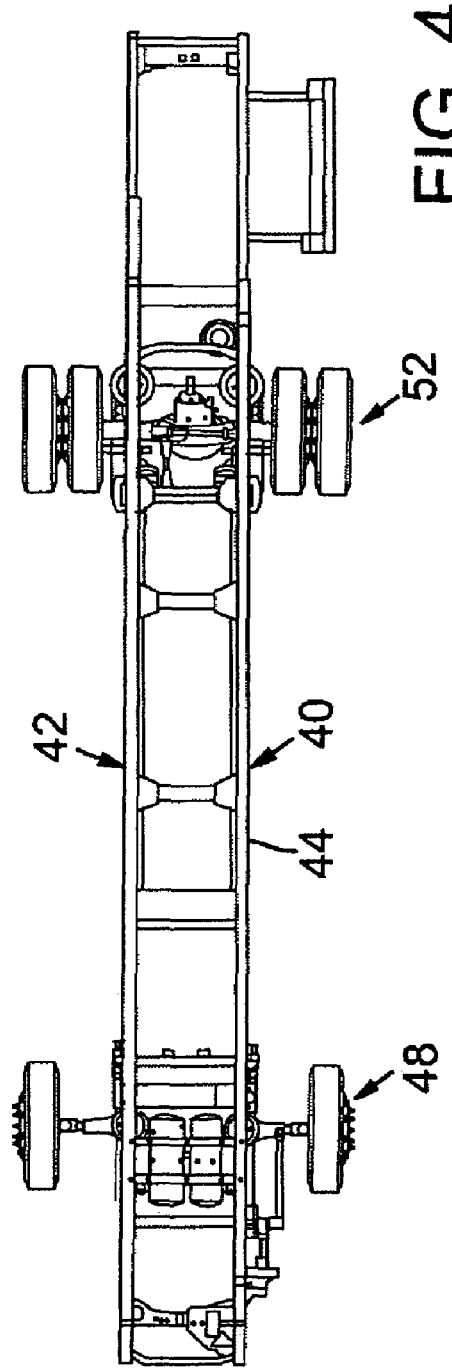
FIG. 4 is a top view of the chassis of FIG. 3.

As a specific example, $H_5$ may be 13 inches, H6 may be 9 inches, $H_7$ may be 13 inches, and $H_8$ may be 9 inches. Thus, with this specific example, the clearance $C_7$ is 4 inches greater than the clearance C6 assuming the frame rail 100 is positioned with its longitudinal axis in a horizontal plane. The upper surface of frame rail sections 140,142 and 144 may be raised, such as 4 inches to increase the height of the vehicle floor a corresponding amount. This would place the vehicle floor at a higher elevation than in the FIG. 1 construction but would also make $C_6$ and $C_1$ the same. However, the elevation of the upper surface of frame rail sections 140,142 and 144 is at a lower elevation than the elevation of the upper surface of frame rail section 44 in FIG. 3 if $C_4$ in FIG. 3 is the same as $C_1$ in FIG. 2. The elevation of the stacked rail sections 44 and 54 of FIG. 3 have a height $H_4$ of 18 inches in comparison to $H_5$ of 13 inches in the FIG. 6. Therefore, the floor height (to of upper rail sections) in FIG. 3 would be 5 inches higher than in FIG. 6 if $C_1$, $C_4$ and $C_6$ is the same. This can make it harder to egress and ingress a vehicle of the FIG. 3 construction because additional height needs to be negotiated. With this specific configuration, $C_7$ in FIG. 6 would thus be 4 inches greater than $C_6$ but where the elevation of the floor (top of the rail) is raised 4", $C_7$ is 8 inches greater than $C_1$. In comparison, $C_5$ would be 9 inches greater than $C_1$. In the FIGS. 6 and 7 constructions, added space for storage is thus provided between the respective wheels 108,112 of the chassis (in comparison to the straight rail embodiment of FIG. 1) while not requiring the floor of the vehicle to be raised as much as in the case of the stacked rail design of FIGS. 3 and 4.

The resistance to bending moment of the FIGS. 6 and 7 constructions is greater than that of specifically known embodiments of the FIGS. 1 and 3 constructions of a frame rail. This is computed below for specific exemplary embodiments of these three types of frame rails.

Definitions:

Iy-y=Moment of Inertia (in ^4)

H=Rail Height (in)

Z=Frame Section Modulus=I/H (in ^3)

S=Yield stress of rail material (psi)

RBM=Resistance Bending moment (industry standard for rating a rail's strength/stiffness)=Z×S (S=50,000 psi in all cases)

Straight Rail: Z=8.25 in ^3; RBM=412,500 in-lb (9"×2.8"×0.25 in thk)

Stacked Rail: Z(avg)=0.34(23.5 in ^3)+0.66(8.25 in ^3)=13.44 in ^3; RBM=672,000 in-lb (18"–9"–18"×2.8"×0.25 in thk) stacked Formed Rail: Z(avg)=0.54(18.04 in ^3)+0.42(10.45 in ^3)+0.04(13.92 in ^3)=14.7 in^3; RBM=735,500 in-lb (13.062–9"–13.062"×3.0"×0.313" thk)

*Note-because the section modulus is not continuous in the stacked and formed rail applications, a weighted average of the section modulus for a 267" wheelbase was used to determine the overall RBM in those cases.

In the above example, it is assumed that the yield stress of the rail material is the same in all cases (50,000 psi) based on the assumption that each of the rails is made of the same steel. If different materials are used, the calculations would be altered accordingly.

FIG. 8 is a side elevation view of a portion of the frame rail section 140. FIG. 8A shows a portion of the top flange 130 of this frame rail portion. FIG. 8B shows a portion of the bottom flange 132 of this frame rail portion. Line A-A in this figure illustrates where this frame rail portion connects with the next frame rail portion shown in FIGS. 9, 9A and 9B. As a specific example, and although variable, the length of the frame rail portion depicted in FIG. 8 from the front end of the frame portion depicted in this figure to line A-A, is 104 inches.

FIG. 9 depicts a portion of the frame rail 100 commencing from line A-A to a line B-B. In FIG. 9, a rear portion of front section 140 is depicted, the transition region 150 is depicted and a portion of the intermediate rail section 142 is shown. Although transition 150 may take other configurations, desirably the lower edge portion of region 150 follows an S-shaped transition. The S-shaped transition is defined by bending radii $R_1$ and $R_2$, which may be the same or different. A specific example of $R_1$ and $R_2$ is 10 inches. The corresponding portion of the upper flange 130 of the frame rail is shown in FIG. 9A and of the lower flange is shown in FIG. 9B. Various openings are shown through these frame rail sections for mounting components thereto. The positioning and number of these openings may be varied. In one specific example, the length of the frame rail section shown in FIG. 9 from line A-A to line B-B is 115 inches.

FIG. 10 shows a portion of the frame rail 100 commencing from line B-B (see also FIG. 9) and ending at line C-C. FIG. 10 illustrates a portion of rail section 142, the transition region 152 and a portion of rail section 144. The transition region 152 may take other configurations but desirably has an S-shaped lower edge portion such as shown in FIG. 10. This transition is defined by radii $R_3$ and $R_4$, which may be the same or different, and may also be 10 inches as a specific example. FIG. 10A depicts a portion of the upper flange 130 while FIG. 10B depicts a portion of the lower flange 132. The length of the rail portion depicted in FIG. 10 from line B-B to line C-C in the specific example under discussion is 109 inches.

FIG. 11 depicts a portion of frame rail 100 at a rear section thereof. In particular, FIG. 11 depicts a rearmost portion of frame rail section 144, the transition region 154 and the rear rail section 146. The transition region 154 may also have an S-shaped upper edge portion, although this may be varied. This transition region is defined by radii, R5 and R6, which may be the same or different, such as 11.5 inches and 10 inches. As can be seen in FIGS. 11A and 11B, the respective flanges 130,134 may optionally be narrowed at 130N, 134N. This provides clearance for equipment mounted thereto. A transition 160 is located between the full width flange 130 and the narrow width flange 130N. In addition, transition region 162 is positioned between the full width flange section 134 and the narrow width flange section 134N. As mentioned previously, the height of rail section 146 may be the same as the height of rail section 144. However, in the construction illustrated, the transition region 154 is used to reduce the height of the upper portion of rail section 146. The length of the portion of the rail depicted in FIG. 11 from line C-C to the end of the rail is 133 inches in the specific example shown.

Thus, the overall length of the exemplary frame rail 100 shown in FIGS. 8, 9, 10 and 11 is 461 inches.

Alternative rear frame rail configurations may be used. FIG. 12 shows one such alternative. In the FIG. 12 version, the top edge portion of the rail comprises a second downwardly extending transition region 164, that may also be S-shaped with radii $R_7$ and $R_8$, prior to the rear end of the frame rail. In addition, the lower edge portion of the frame rail 134 may also have a downwardly extending transition region 168, that may also be S-shaped with radii $R_9$ and $R_{10}$. In this example, the height $H_7'$ of the frame rail section between transition regions 164 and 168 may be the same as $H_7$, for example thirteen inches, although this may be varied. Also, the steps X, Y and Z and the respective transition sections 154, 164 and 168 may each be the same, such as four inches, although this may be varied.

Having illustrated and described the principles of our invention with reference to several embodiments, it should be apparent to those of ordinary skill in the art that such arrangements may be modified without departing from the principles of our invention. We claim all such modifications. More specifically, we claim all novel and non-obvious features of a frame rail depicted herein both alone and in various combinations and subcombinations with one another.

We claim:

1. A frame rail for use in a vehicle frame rail assembly comprising:
 a front section;
 an intermediate section; and
 a rear section;
 wherein the sections are seamlessly transitioned from a front of the rail to a rear of the rail, each section comprising an upper surface and a lower surface, the lower surface of the front section converging toward the upper surface of the front section at a first transition between the front section and intermediate section, the lower surface of the intermediate section diverging from the upper surface of the intermediate section at a second transition between the intermediate section and the rear section;
 wherein when the frame rail is horizontal, the elevation of the upper surfaces of at least a rear portion of the front section, of the intermediate section, and of at least a forward portion of the rear section is the same; and
 wherein the lower surface of the front section transitions into the lower surface of the intermediate section at a first transition, the first transition comprising a first bend defining a first radius and a second bend defining a second radius, and wherein the lower surface of the intermediate section transitions into the lower surface of the rear section at a second transition, the second transition comprising a third bend defining a third radius and a fourth bend defining a fourth radius;
 wherein the rear section comprises at least a first rear portion and second rear portion, the first rear portion being forwardly of the second rear portion, and wherein there is a seamless transition between the first and second rear portions;
 wherein the rear section comprises at least a third rear portion rearwardly of the second rear portion and in addition to the first and second rear portions, and wherein there is a seamless transition between the second and third rear portions; and
 wherein the seamless transitions between the first and second rear portions and between the second and third rear portions are each rearwardly of a rear axle mounting location where a rear axle is to be coupled to the frame rail.

2. The frame rail of claim 1, wherein the first transition and the second transition are each substantially S-shaped.

3. The frame rail of claim 1, wherein the front section has at least a major portion with a height $H_5$ that is less than 1.5 times the height $H_6$ of at least a major portion of the intermediate section, but more than 1.0 times the height $H_6$.

4. The frame rail of claim 1, wherein the rail is made of a monolithic homogenous material.

5. The frame rail of claim 1, wherein the upper surfaces of the front section, intermediate section, and at least a forward portion of the rear section are coplanar.

6. The frame rail of claim 1, wherein the upper surface of the second rear portion is at a lower elevation than the upper surface of the first rear portion when the frame rail is horizontal.

7. The frame rail of claim 6, wherein a third transition is positioned between the first rear portion and the second rear portion, the upper surface of the first rear portion converging toward the lower surface of the first rear portion at the third transition.

8. The frame rail of claim 1 wherein the upper surface of the second rear portion is at a lower elevation than the upper surface of the first rear portion and the upper surface of the third rear portion is at a lower elevation than the upper surface of the second rear portion when the frame rail is horizontal.

9. The frame rail of claim 8 wherein the lower surfaces of the second and third rear portions are both at a lower elevation than the lower surface of the intermediate section when the frame rail is horizontal.

10. The frame rail of claim 9 wherein the lower surfaces of the second and third rear portions are the same when the frame rail is horizontal.

11. The frame rail of claim 1, wherein each of the seamless transitions are of a substantially S-shape.

12. The frame rail of claim 11, wherein in cross-section, the frame rail is substantially C-shaped.

13. The frame rail of claim 1, wherein the upper and lower surfaces are flanges, the flanges being coupled together by an upright web.

14. A frame rail according to claim 1 wherein each of the front, intermediate and rear sections comprises an outer side surface in addition to the upper and lower surfaces, and wherein the outer side surface has a longitudinal axis that from a portion of the front section to a portion of the rear section is positioned in a plane.

15. At least two frame rails according to claim 1 included in a frame rail assembly for vehicles having at least one front and at least one rear axle, each frame rail comprising in a front to rear direction, the front section, a first transition portion, the intermediate section, a second transition portion, and the rear section, the frame rails extending seamlessly from at least a portion of the front section to at least a portion of the rear section, each of said sections and portions of the frame rails comprising an upper and lower flange, the upper and lower flanges being parallel to one another along at least a portion of the front section, along at least a portion of the intermediate section, and along at least a portion of the rear section forwardly of the rear axle, wherein in a front to rear direction along the frame rail the upper and lower flanges of the first transition portion converge and the upper and lower surfaces of the second transition portion diverge; and
    wherein the upper flanges of the front section, the first transition portion, the intermediate section, the second transition portion, and at least a portion of the rear section forwardly of the rear axle of each frame rail have upper surfaces that are coplanar.

16. First and second frame rails according to claim 1 combined in a vehicle chassis, the first and second frame rails each supported by at least one front axle and at least one rear axle with wheels and tires mounted to each axle and engaging the ground, wherein the clearance between the ground and the lower surface of the intermediate section is four inches greater than the clearance between the ground and the lower surface of the front section and wherein the height between the ground and the upper surface of the intermediate section is nine inches greater than the clearance between the ground and the lower surface of the intermediate section.

17. A vehicle chassis of claim 16 having only two axles.

18. A vehicle chassis according to claim 16 wherein the first and second frame rails do not converge toward one another between the front and rear axles.

19. A vehicle chassis according to claim 18 wherein the first and second frame rails do not converge toward one another throughout their entire length.

20. A vehicle chassis according to claim 16 wherein each of the first and second frame rails are unitary one-piece monolithic frame rails.

21. The vehicle chassis of claim 16, wherein the upper surfaces of the front section, the intermediate section, and at least a portion of the rear section forwardly of the rear axle of each of the first and second frame rails are at the same elevation when the first and second frame rails of the chassis are horizontal.

22. A frame rail according to claim 1 wherein each of the front, intermediate and rear sections comprise upper and lower flanges and
    wherein the upper flanges of at least a section of the front section, the middle section and at least a section of the rear section are straight.

23. A frame rail according to claim 22 wherein each of the front, middle and rear sections each have a side surface and all of said side surfaces are in a common plane.

24. A frame rail according to claim 22 wherein each upper flange has an upper surface and wherein the upper surfaces are coplanar.

25. The frame rail of claim 1, wherein a height $H_5$ of the front section is thirteen inches, wherein a height $H_6$ of the intermediate section is nine inches, and wherein the height $H_7$ of at least a section of the rear portion is thirteen inches.

26. The frame rail of claim 1 wherein the height $H_5$ of at least a major section of the front section is less than 1.5 times the height of $H_6$ of at least a major section of the intermediate section and $H_5$ is also greater than $H_6$ and wherein the height $H_7$ of at least a major section of the rear portion is greater than $H_6$ and less than 1.5 times the height $H_6$.

27. The frame rail of claim 26 wherein $H_5$ and $H_7$ are each 13/1 times $H_6$.

28. A frame rail for use in a vehicle frame rail assembly comprising:
    a front section;
    an intermediate section; and
    a rear section;
    wherein the sections are seamlessly transitioned from a front of the rail to a rear of the rail, each section comprising an upper surface and a lower surface, the lower surface of the front section converging toward the upper surface of the front section at a first transition between the front section and intermediate section, the lower surface of the intermediate section diverging from the upper surface of the intermediate section at a second transition between the intermediate section and the rear section;
    wherein when the frame rail is horizontal, the elevation of the upper surfaces of the front section, intermediate section, and at least a forward portion of the rear section is the same;
    wherein the rear section comprises at least a first rear portion and a second rear portion, the first rear portion being forwardly of the second rear portion, and wherein there is a seamless transition between the first and second rear portions;
    wherein the upper surface of the second rear portion is at a lower elevation than the upper surface of the first rear portion when the frame rail is horizontal;
    wherein a third seamless transition is positioned between the first rear portion and the second rear portion, the upper surface of the second rear portion being at a lower elevation than the upper surface of the first rear portion when the frame rail is horizontal;

the rear section comprises at least a third rear portion rearwardly of the second rear portion and in addition to the first and second rear portions, and wherein there is a fourth seamless transition between the second and third rear portions, the third and fourth transitions being rearwardly of a rear axle mounting location; and the upper surface of the third rear portion being at a lower elevation than the upper surface of the second rear portion when the frame rail is horizontal.

29. A frame rail according to claim 28 wherein an uppermost surface of each section defines a top edge and a bottommost surface of each section defines a bottom edge, the distance $H_5$ between the top and bottom edges of at least a major section of the front section and the distance $H_{13}$ between the top and bottom edges of at least a major section of a forward portion of the rear section being less than 1.5 but more than 1.0 times the distance $H_6$ between the top and bottom edges of at least a major section of the intermediate section.

30. A frame rail according to claim 29 which is a unitary monolithic frame rail.

31. The frame rail of 28, wherein the lower surfaces of the second and third rear portions are at a lower elevation that the lower surface of the first rear portion when the frame rail is horizontal.

32. The frame rail of claim 31 wherein the lower surfaces of the second and third rear portions are the same when the frame rail is horizontal.

* * * * *

UNITED STATES PATENT AND TRADEMARK OFFICE
CERTIFICATE OF CORRECTION

PATENT NO. : 7,350,818 B2
APPLICATION NO. : 10/975691
DATED : April 1, 2008
INVENTOR(S) : Pitsenbarger et al.

Page 1 of 1

It is certified that error appears in the above-identified patent and that said Letters Patent is hereby corrected as shown below:

In the Specification:

Column 8, line 36, "13/1" should read --13/9--.

Column 10, line 8, "of 28" should read --of claim 28--.

Column 10, line 10, "that" should read --than--.

Signed and Sealed this

Tenth Day of March, 2009

JOHN DOLL
*Acting Director of the United States Patent and Trademark Office*